May 6, 1952 L. A. ROMAN 2,595,485
SEPARABLE FASTENER ROTATING HEAD
Filed March 10, 1949

INVENTOR.
Louis A. Roman
BY
ATTORNEY

Patented May 6, 1952

2,595,485

UNITED STATES PATENT OFFICE 2,595,485

SEPARABLE FASTENER ROTATING HEAD

Louis A. Roman, Brooklyn, N. Y.

Application March 10, 1949, Serial No. 80,627

1 Claim. (Cl. 24—221)

This invention relates to new and useful improvements in devices for coupling various relatively movable members of a manikin structure, as to function, for instance, as a wrist coupling; and, more particularly, the aim is to provide a novel and valuable coupling device characterized by a spring action which renders effective a frictional lock between the coupled manikin members yet with such lock rotationally adjustable to vary the angle of extension of one of said members relative to the other within wide limits.

A feature of the invention is the provision of means whereby in any such angular adjustment of said members, fixation of the adjustment is dependably maintained by spring-urged frictional action.

A further object of the invention is to provide a coupling device as above, which is simple in construction and hence inexpensive to manufacture, which is capable of long life, and which, incorporating two parts one presenting a socket means and the other a cooperant post means, has these parts so made that each is readily attachable to a different one of the two members to be coupled; while, at the same time, the coupling device is so constituted that one of said two coupling parts may be instantaneously wholly disconnected from the other.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
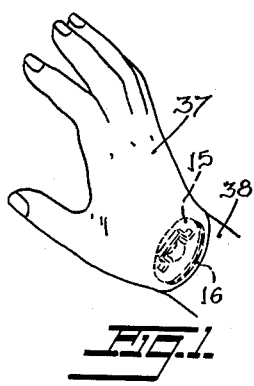
Fig. 1 is a perspective view, showing the new device in use for adjustably interconnecting a hand and a fore-arm of a manikin.

Referring to the drawings more in detail, the aforesaid two parts are marked generally, respectively, 15 and 16.

The part 15 includes a flat elliptical plate 17 centrally apertured at 18, through which aperture is extended a portion of a post 19 where the latter is flattened along opposite sides as indicated at 20; the aperture 18 having a cross-sectional area corresponding to that of said flattened portion of said post. The upper end of the post is apertured at 21, and the lower cylindrical portion of the post carries an offset pin 22. The flattened portion of the post provides a stem 23 of non-circular cross-section, for keying the post against turning relative to the plate 17; with the lower end of such stem set off by a pair of shoulders 24.

Figure 5:
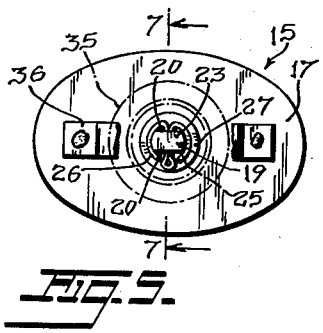
Fig. 5 is a plan view (partially broken away, and omitting an element indicated in dot and dash lines) of the part equipped with the post means.
Figure 6:
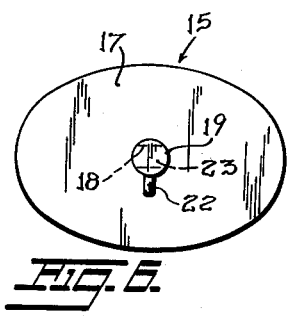
Fig. 6 is a view of said part, looking at the face thereof to be abutted against a similar face of the part equipped with the socket means.
Figure 7:
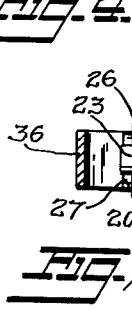
Fig. 7 is an enlarged detail view, this being a section taken on the line 7—7 of Fig. 5.
Figure 8:
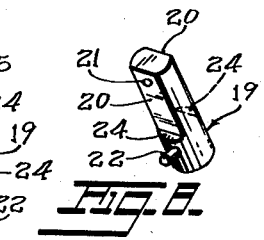
Fig. 8 is a perspective view of a component of the post means.

With the stem 23 inserted through the aperture 18, an expansile coil spring 25 is sleeved on the stem, a washer 26 is applied, and a cotter-pin 27 is sent through the post's aperture 21 and crimped as shown in Fig. 5. The spring 25 acts strongly to urge the post 19 to its position shown in Fig. 7; and the arrangement is such that the pin 22 is thereby held spaced from the adjacent face of the plate 17 by a distance equal merely to such a spacing as that indicated between the dot and dash lines 28 and 29 of Fig. 7. In this view the spacing between the said line 28 and the dot and dash line 30 is representative of the thickness of a plate 31 of the part 16 which corresponds to the plate 17 of the part 15.

Said plates 17 and 31 as here shown are alike, except that the plate 31 is centrally apertured to provide a key-hole shaped slot 32, the main circular portion of which is of an area corresponding to the cross-section of the cylindrical portion of the post 19 and the lesser offset portion of which is of an area to allow passage therethrough of the pin 22.

Figure 9:
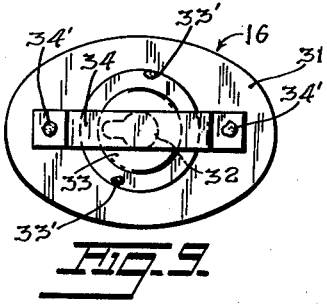
Fig. 9 is a plan view of the part equipped with the socket means, looking at the face thereof opposite to its face to be abutted against that face of the other part seen in Fig. 5.

The part 16 is completed by the addition, at the rear face thereof, of a cup 33 and a U-shaped strap 34, these attached as by spot welding, as indicated at 33' and 34' in Fig. 9.

The part 15, equipped as already described, is completed by the addition, also at the rear face thereof, of a cup 35 and a U-shaped strap 36 similar, respectively, to the cup 33 and the strap 34; which parts 35 and 36 are also desirably attached by spot welding.

The cup 36 of the part 15 protectively houses the elements 23—27, and the cup 35 matchingly finishes off the rear side of the part 16.

*Operation*

Figure 2:
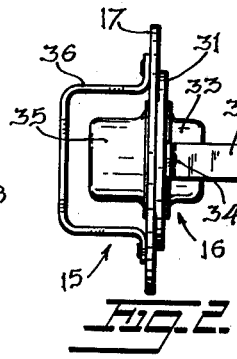
Fig. 2 is substantially a full-scale side elevational view of said two parts of the device, as brought together in face abutting relation in preparation for imparting a rotational movement of one thereof relative to the other to couple said parts.
Figure 3:
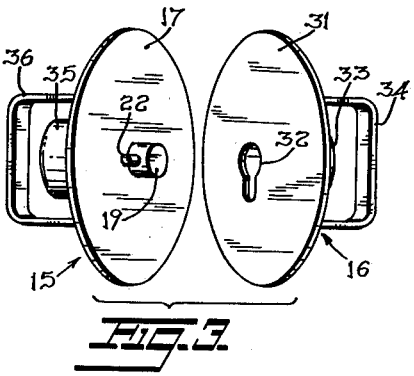
Fig. 3 is an exploded view, showing both said parts, each in such perspective that the post means of one and the socket means of the other are seen.
Figure 4:
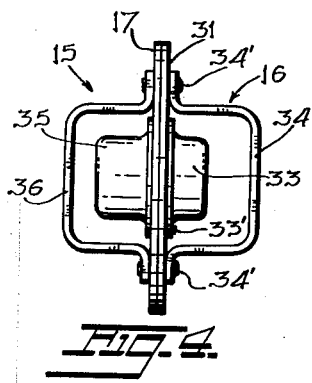
Fig. 4 is a view like Fig. 2, but with one of said parts rotated through 90° to effect a coupling thereof.
Figure 10:
Fig. 10 is a fragmentary sectional view, showing the redispositions of certain elements illustrated in Fig. 7, following a fractional rotation of either of the parts of Fig. 3 relative to the other.

With, say the part 15 suitably secured, as by aid of its strap 34, to the wrist end of a manikin's hand 37, and with the part 16 similarly secured to the wrist end of the manikin's forearm 38, the two parts 15 and 16 are first brought together as shown in Fig. 2, that is, to bring the front faces of the plates 17 and 31 into surface contact following passage of the post 19 through and the pin 22 into and partially through the slot 32. Then one of said parts 15 and 16 is fractionally rotated in either direction to an extent to position the manikin member 37 at a desired angle on the manikin member 38. As the parts 15 and 16 are shown in Fig. 4, such relative rotation has been a 90° one. At the initiation of this rotation, the pin 22 was acted on cammingly by a side of the lesser offset portion of the slot 32, and thereby the post 19 was endwisely moved against the tension of the spring 25 to space the shoulders 24 of the post away from the front face of the plate 17 to the extent indicated in Fig. 10. On completion of such camming action, the pin 22 was locked behind the plate 17. Thereupon, the abutting faces of the plates 17 and 31 were clamped tight disk-clutch fashion, absolutely to prevent accidental or casual rotation of either of the parts 15 and 16 relative to the other. Yet either of said parts is always deliberately easily adjustable relative to the other through almost the entirety of 360°.

Figure 11:
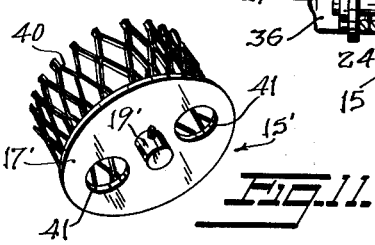
Fig. 11 is a perspective view of the part equipped with the post means constructed in accordance with a modification of the present invention.

In the modification of the invention shown in Fig. 11, the plate 17' of the part 15' has the post 19' securely attached to the front face thereof to be an integral unit with the plate 17'. The pin 22' extends radially from the post 19' at such a location that the space between the pin 22' and the face of the plate 17' will be equal to the thickness of the plate of the socket containing member, not shown. However, the spacing is such that the post 19' and the pin 22' when engaged with the socket of the other member will retain the plates in intimate frictional contact with each other so as to prevent free rotational movement of the members relative to one another.

Projected from the back face of the plate 17', there is a grill 40 formed of stiff wire which is to be molded into the material of the manikin, as is generally known by those skilled in the art. On opposite sides of the post 19', the plate 17' is formed with holes 41 for ventilation purposes.

In other respects, this form of the invention is similar to that previously described.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A coupling for a pair of adjacent plates, comprising an elongated post circular in cross section and having a flat surface on at least one side thereof and extended in from one end of said post to a point spaced inward of the other end thereof forming a shoulder at said point, one of the plates having an aperture corresponding in shape to the cross-sectional shape of that portion of said post having said flat surface and through which that flat surfaced portion of said post is slidable but non-rotatively extended, a pin projected laterally from the end of said post remote from said flat surface, resilient means urging said post to move said shoulder to abut an adjacent face of the said one plate, the other of the plates having a key-hole shaped slot for passing said pin and the adjacent end portion of said post after which the said other plate can be turned relative to the said one plate causing said pin to bear against the outer face of said other plate, said pin being mounted on said post with its central axis spaced from said shoulder a distance slightly greater than the thickness of the material from which the said other plate is made, so constructed and arranged that with said pin bearing against the outer face of the said other plate said post will be drawn axially placing said resilient means under sufficient tension to urge the plates into rigid facial contact.

LOUIS A. ROMAN.

REFERENCES CITED

The following references are of record in the file of this patent:

UNITED STATES PATENTS

| Number | Name | Date |
| --- | --- | --- |
| 1,272,992 | Palmenberg | July 16, 1918 |
| 2,033,875 | Brantley | Mar. 10, 1936 |
| 2,187,426 | Kuhnel | Jan. 16, 1940 |
| 2,458,917 | Frisco | Jan. 11, 1949 |